March 1, 1938. I. KOVACH 2,109,728
SAFETY REAR AUTO SEAT
Filed July 27, 1936
Fig. 1
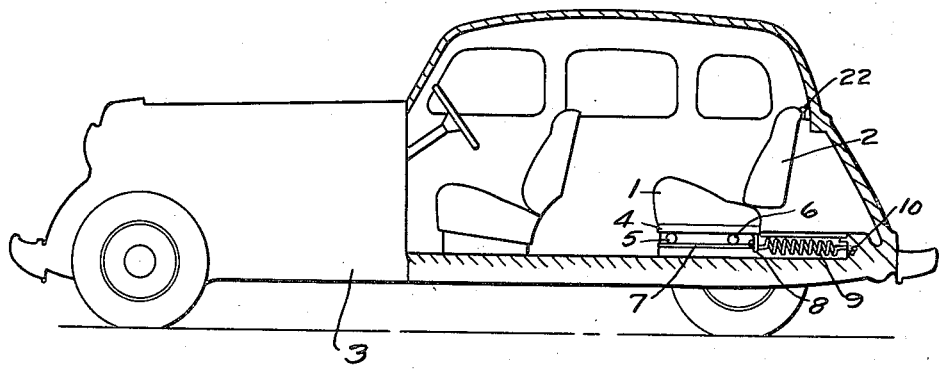
Fig. 2
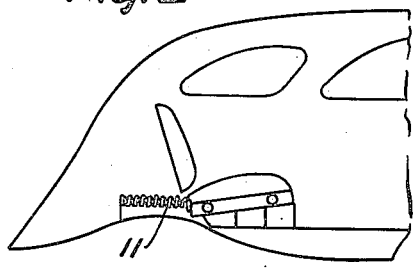
Fig. 3
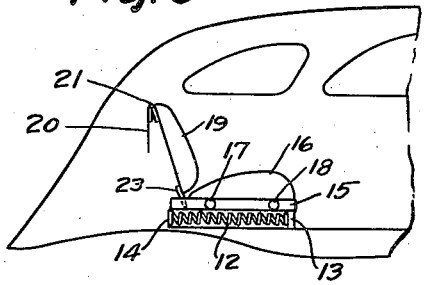
Fig. 4
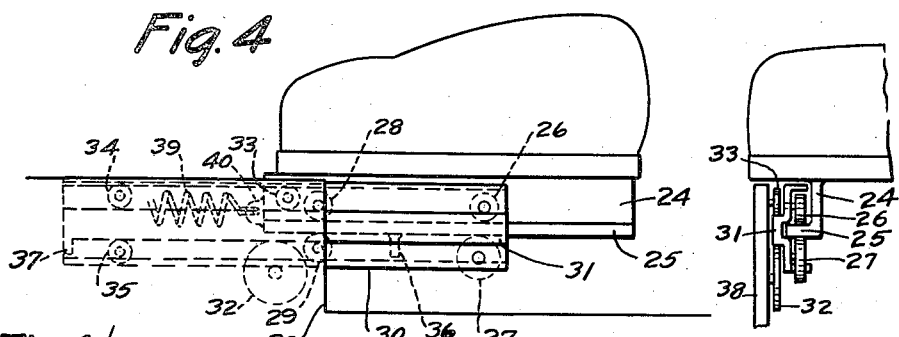
Fig. 6
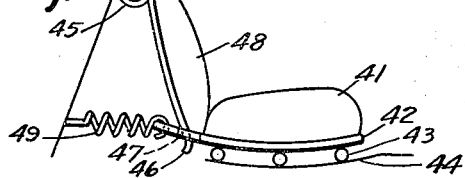
Fig. 5
INVENTOR.
*Imre Kovach*
BY *James Harrison Bowen*
ATTORNEY.

Patented Mar. 1, 1938

2,109,728

UNITED STATES PATENT OFFICE 2,109,728

SAFETY REAR AUTO SEAT

Imre Kovach, Bronx, N. Y.

Application July 27, 1936, Serial No. 92,721

1 Claim. (Cl. 155—9)

The purpose of this invention is to eliminate the danger and discomfort experienced by occupants of vehicles seated upon the rear seat when the motion of the vehicle is suddenly and unexpectedly restrained, especially as in an automobile in which the rear seat occupants are unaware of the fact that the vehicle is to be brought to a sudden stop.

The invention is a mounting for the rear seat of vehicles and particularly of motor vehicles, in which the rear seat may move forward with or without the back, and the movement of the seat is restrained by springs which also return the seat to its normal position.

Many devices have been provided for mounting the front seats of motor vehicles so that they may be adjusted or moved forward or backward, however, the rear seat is stationary, and as the occupants of the rear seat cannot see approaching danger, they are generally surprised and, therefore, not aware of the fact that the vehicle is to be brought to a sudden stop, so that they cannot brace or prepare themselves and, therefore, they are often thrown against the back of the front seat; whereas with the seat slidably mounted the inertia thereof will cause it to move forward when the vehicle is suddenly restrained, and this will permit the body to move forward with the head drawn backward, thereby eliminating the danger of injury by striking the head against the front seat.

The object of the invention is, therefore, to provide means whereby the rear seat of a vehicle will travel forward with the occupants thereof when the vehicle is suddenly restrained.

Another object is to increase the comfort of rear seat passengers of motor vehicles by providing a seat that is not rigid, and that is adapted to slide to compensate for movements of the vehicle.

A further object is to provide a movable rear seat having resilient means for returning the seat to its normal position.

And a still further object is to provide means for slidably mounting the rear seat of motor vehicles and the like which is of a simple and economical construction.

With these ends in view the invention embodies a track having rollers thereon upon which the rear seat of motor vehicles may be mounted, and springs connecting said seat to the frame of the vehicle providing resilient restraining means and also means for returning the seat to the normal position.

Other features and advantages of the invention will appear from the following description taken in connection with the drawing, wherein:

Figure 1 is a view showing an outline of an automobile with parts broken away showing the movable rear seat.

Figure 2 also shows an outline with the seat movable and with the back thereof stationary.

Figure 3 is a similar view with the back also movable, and this also shows an alternate type of spring in which a compression instead of a tension spring is used.

Figure 4 is a view showing a detail of the seat mounting with parts broken away and parts omitted.

Figure 5 is an end view of one corner of the seat shown in Figure 4.

Figure 6 is a view showing another alternate design showing the rear seat mounted upon rollers in a curved track.

In the drawing the device is shown as it may be made, wherein numeral 1 indicates the movable rear seat, numeral 2 the back, and numeral 3 a vehicle in which it may be mounted.

The seat 1 may be of any type or design and may be mounted upon a base or any means may be used to permit sliding thereof. The seat is shown mounted upon rollers, however, it will be understood that the rollers may be omitted and the seat may be slidable in the mounting.

In the design shown in Figure 1 the seat is provided with a base 4 which is mounted upon rollers 5 and 6, and these are held in a track 7 so that the seat may roll forward or backward; and at the rear of the seat is a projection 8 which is attached to a spring 9, the opposite end of which is attached to the frame at the point 10, and it will be noted that as the seat moves forward, tension will be placed upon the spring or springs and as soon as the pressure is released the spring will return the seat to the normal position.

The tension spring is also shown in Figure 2, in which it is indicated by the numeral 11, and in Figure 3, which shows an alternate design, the springs 12 are located directly under the seat, and these bear against a fixed member 13 with the other end engaging a projection 14 at the rear of the seat mounting 15. In this design the seat 16 is mounted upon rollers 17 and 18 and the back 19 is hinged to a stationary part 20 of the vehicle through a hinge 21. This mounting is somewhat similar to the mounting shown in Figure 1, in which the back 2 is mounted by a hinge 22 at the upper end, and in either case the back is adapted to move forward with the seat, and the lower edge thereof may be attached to the seat by a projection 23 shown in Figure 3 or by any means.

In the design shown in Figures 4 and 5 the seat is provided with rails 24 having flanges 25 at their lower ends, and these are held between rollers 26 and 27 at the front and 28 and 29 at the rear, and these rollers are mounted in sliders 30 which are also provided with projections 31 that are held between rollers 32 and 33 at the front and rollers 34 and 35 at the rear. It will be noted that as the seat moves outward the flanges 25 roll outward between the rollers and at the same time the sliders 30 roll outward on the rollers upon which they are mounted. The flanges 25 may be provided with a stop 36 to limit the outward movement of the seat in relation to the sliders 30 and the sliders may be provided with a projection 37 to limit their outward movement in the frame of the vehicle, which is indicated by the numeral 38. In this design the seat is provided with springs 39 which are attached to projections 40 at the rear ends of the rails 24.

The seat may also be mounted on an incline as shown in Figure 2 so that after it moves forward it will have a tendency to roll backward and it will be noted that by mounting the seat in this manner it will be possible to reduce the size of the spring.

In Figure 6 the seat 41 is provided with a curved base 42 and this is mounted on rollers 43 in a curved track 44. In this design the back of the seat is hinged at the point 45 and the lower end 46 thereof extends through an opening 47 in the base 42 so that as the seat rolls forward it will draw the back 48 with it. In this design the base 42 is resiliently held in the normal position by springs 49.

It will be understood that other changes may be made in the construction without departing from the spirit of the invention. One of which changes may be in the use of other means for slidably mounting the seat, another may be in the use of other means for restraining the outward movement of the seat, and still another may be in the use of other means for connecting the back to the seat or for moving the back outward.

The construction will readily be understood from the foregoing description. In use the device may be mounted in a motor vehicle or other object as shown and described, or by any other means and, as hereinbefore stated, when the vehicle comes to a sudden stop the seat will move outward and the head backward, whereas with the seat held stationary the head will be thrown forward. It will be understood that although this device is shown and described as adapted for motor vehicles it may be used for any other purpose.

Mounting the seat in this manner produces the same effect to the seat occupant as would the gradual application of the brakes as, as the seat moves forward due to any sudden stop, the occupant of the seat will be carried forward with it, which action will cause the occupant's head to be drawn back instead of being projected forward. It is this forward projection of the occupant's head that is of the gravest danger to him every time the car is brought to a sudden stop.

It is a common fact that even at moderate speeds, the sudden application of the modern type braking power endangers the safety of the occupants of the rear seat every time this braking power is brought into action.

Therefore, it is evident that the danger and uncomfort which is always present at every sudden application of the brakes in the present seating construction, is entirely eliminated by the safety seat as described above.

Having thus fully described the invention, what I claim as new and desire to secure by Letters Patent, is:

In combination with an automobile body having front and rear seats, a mounting for the rear seat thereof, in which the seat is provided with a back, and the upper edge of the back is hingedly attached to the rear of the automobile body, said mounting comprising relatively horizontal tracks at the opposite sides of the seat and permanently mounted in the said automobile body, rollers mounted in bearings, with the bearings fixedly attached to the underside of the seat and positioned to travel forward and backward in said tracks, and springs fixedly attached to the underside of the seat, and also to the body of the automobile under the seat and adjacent the rear thereof, said springs restricting the forward movement of said seat, and forming the only holding means holding said seat in the normal position; said device further characterized in that the axes of said springs are parallel to and in alignment with the line of force.

IMRE KOVACH.